(12) United States Patent
Hogle et al.

(10) Patent No.: US 6,560,626 B1
(45) Date of Patent: May 6, 2003

(54) THREAD INTERRUPTION WITH MINIMAL RESOURCE USAGE USING AN ASYNCHRONOUS PROCEDURE CALL

(75) Inventors: Francis M. Hogle, Redmond, WA (US); Tracy C. Sharpe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/054,158

(22) Filed: Apr. 2, 1998

(51) Int. Cl.[7] .................................................. G06F 9/46
(52) U.S. Cl. ........................................ 709/102; 709/310
(58) Field of Search .................................. 709/104, 318, 709/330, 102, 107, 108, 310, 313; 710/200; 712/244

(56) References Cited

U.S. PATENT DOCUMENTS

| | | | |
|---|---|---|---|
| 5,327,558 A | * 7/1994 | Burke et al. ................. 395/650 |
| 5,623,676 A | * 4/1997 | Horiguchi et al. ........... 395/735 |
| 5,675,796 A | 10/1997 | Hodges et al. |
| 5,968,157 A | * 10/1999 | Joy et al. ..................... 710/200 |
| 6,006,247 A | * 12/1999 | Browning et al. ........... 709/102 |
| 6,128,640 A | * 10/2000 | Kleinman ..................... 709/102 |
| 6,182,108 B1 | 1/2001 | Williams et al. |

OTHER PUBLICATIONS

Author unknown, IBM Technical Disclosure Bulletin, Apr. 1, 1997, T.DB ACC NO NN9704151, vol. 40, Issue No. 4, pp. 151–152.*

* cited by examiner

*Primary Examiner*—Sue Lao
*Assistant Examiner*—Gary Scott Fourson
(74) *Attorney, Agent, or Firm*—Klarquist Sparkman LLP

(57) ABSTRACT

A thread interruption function in a multi-threaded runtime environment places a first thread in an alertable blocked state that is interrupted by another thread upon request. The interrupting thread causes an asynchronous procedure call (APC) to be queued against the blocked thread. A callback procedure associated with the APC is executed in a context of the blocked thread and an indicator is stored in the context of the blocked thread. The indicator is captured by runtime environment exception handing which causes the blocked thread to be activated.

28 Claims, 6 Drawing Sheets

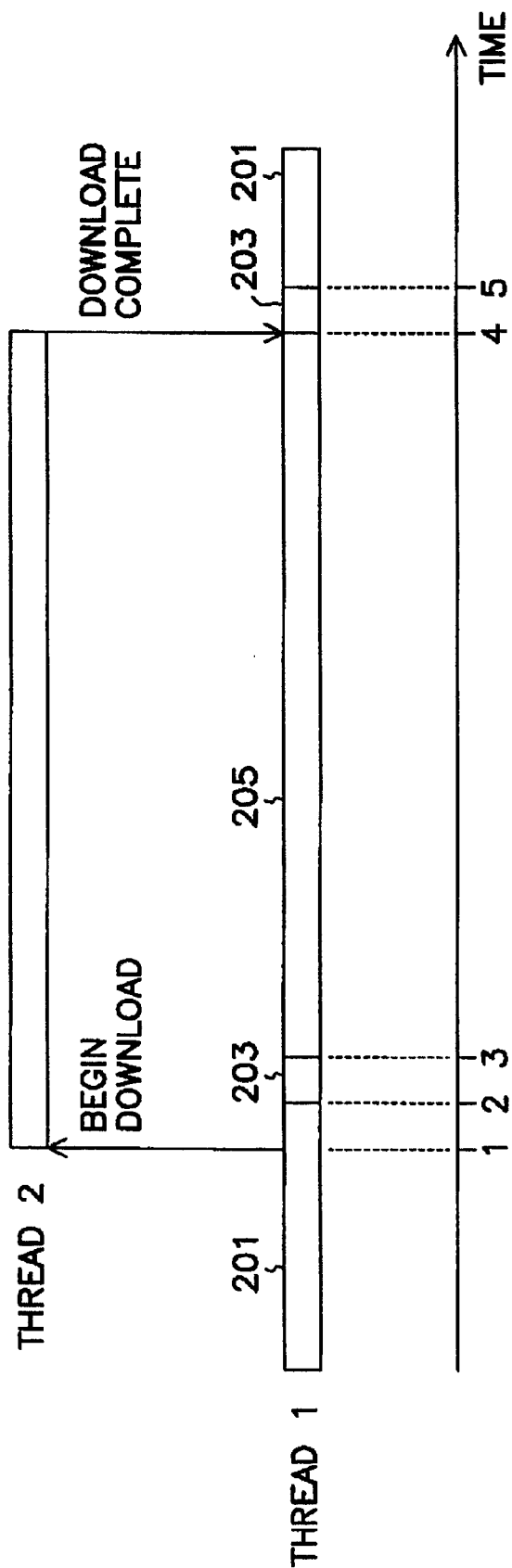

US 6,560,626 B1

THREAD INTERRUPTION WITH MINIMAL RESOURCE USAGE USING AN ASYNCHRONOUS PROCEDURE CALL

FIELD OF THE INVENTION

This invention relates generally to multi-threaded computer processing, and more particularly to interruption handling for such processing.

BACKGROUND OF THE INVENTION

A computer's central processing unit (CPU) can only execute one instruction at a time. However, fast CPUs are capable of executing many instructions each second so that by switching between instructions in one program and those in another, the computer appears to the user to be running multiple programs simultaneously. Furthermore, a single program can have multiple concurrent processes, or threads, which are dynamically created and terminated by a main thread.

The operating system determines which thread should be run and which should be suspended. Many mechanisms are well-known for scheduling threads in a multi-threaded computer environment but all rely, to some extent, on the fact that most threads must periodically wait for something to happen and do not require CPU time while they are waiting. Typically threads wait for user input, for data to be retrieved from a storage device, or similar external events. A thread can also put itself to sleep for a specified period of time. For example, a thread may perform a certain operation at specific intervals and sleep between those operations.

In either case, the thread generally enters a non-interruptible, blocked (non-running) state until the conditions of the wait or sleep function are satisfied. A sleeping thread typically resumes execution when the specified period of time has elapsed. A waiting thread resumes execution when a specified synchronization object goes through a state transition. Among standard synchronization objects are counting semaphores and "mutex" ("mutual exclusion") objects. Most implementations of the wait function also provide an optional timeout period so that the waiting thread unconditionally resumes execution after the timeout period expires even though the specified synchronization object has not yet undergone a state change.

Because the thread functions are unavailable during its blocked state, an additional feature of some wait and/or sleep functions permits another thread to prematurely terminate, or interrupt, the wait or sleep so that the waiting/sleeping thread resumes execution. Such interruptible wait/sleep functions can be based on the non-interruptible version of the wait function by including a synchronization object in the set of conditions that control the wait function. When another thread requests that the waiting thread be interrupted, the operating system signals the synchronization object to change its state. An interruptible sleep function is frequently implemented using the above-described interruptible wait function by setting the optional timeout period equal to the sleep period.

The processor cost for such interruptible wait/sleep functions which use synchronization objects are high. Since each blocked thread must be individually addressable to be awoken, a particular synchronization object must be associated with each blocked thread. Thus, the resource utilization of the function increases in linear fashion with the number of threads in the multi-threaded environment. Theoretically, a percentage of this resource cost can be mitigated by taking advantage of the fact that the synchronization objects are only required when a thread is actually waiting or sleeping. However, in practice, such savings are small, as most threads in a multi-threaded environment spend the bulk of their elapsed time waiting for predetermined conditions to be satisfied.

Therefore, there is a need in a multi-threaded processing environment for thread interruption which does not exhibit the linear increase in resource utilization exhibited by synchronization objects as the number of threads increases.

SUMMARY OF THE INVENTION

A thread interruption function in multi-threaded runtime environment allows a thread to enter an alertable blocked state so that it can be awakened upon request by another thread. The wake up request causes the runtime environment to queue an asynchronous procedure call (APC) against the blocked thread. A callback routine associated with the APC is processed in a context of the blocked thread when the blocked thread is in the alertable state. An indicator associated with the APC is stored in the context of the blocked thread so that exception handling in the runtime environment captures the indicator and the blocked thread is activated as a result of the capture to complete the wake up process. The indicator can be created and stored by the callback routine. Alternatively, the indicator can be created and stored at the time the APC is queued against the blocked thread or after the callback routine has been processed. In one aspect of the invention, the indicator is implemented as a standard Java exception class.

Because an APC does not require the use of a synchronization object to wake up a blocked thread, the impact of the invention on the resource overhead of the runtime environment is minimal. Additionally, the use of standard APCs requires little additional programming to implement the thread interruption function.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 2A is time-line diagram illustrating a system-level overview of interactions between two threads;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for exemplary embodiments of the invention are provided. In the fourth section, a particular Java runtime environment implementation of the invention is described. Finally, in the fifth section, a conclusion of the detailed description is provided.

Hardware and Operating Environment

Figure 1:
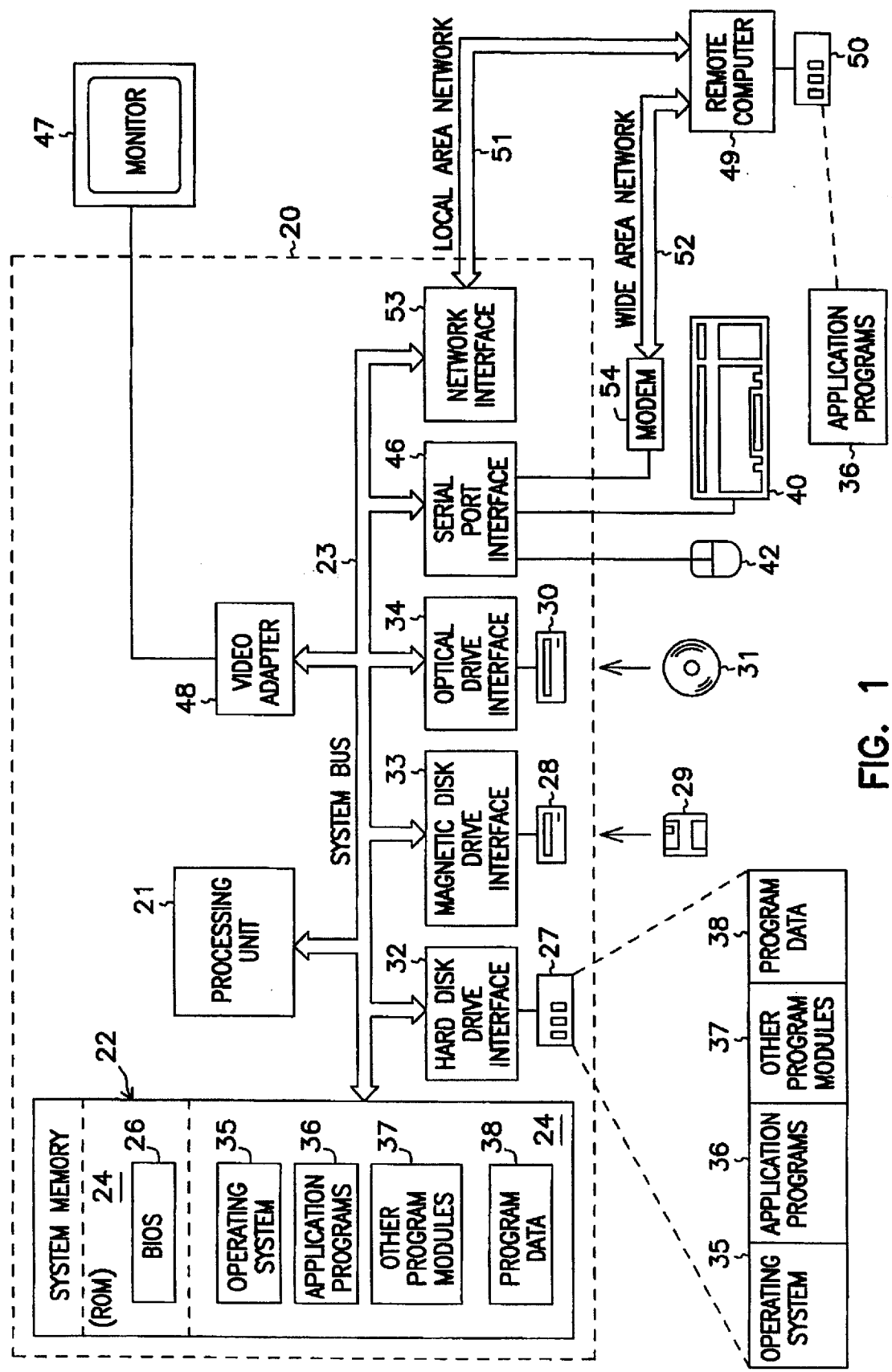
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A and 2B which show time lines of thread interactions in a multi-threaded processing environment executing in a computer such as computer 20 in FIG. 1. A single program can have multiple concurrent processes, or threads, which are dynamically created and terminated. All the information relevant to the execution of a thread, such as its pointers, register values, etc., are referred to as the thread's "context." When the computer switches from executing one thread to executing another thread, the computer is said to "switch contexts." The operating system of the computer is responsible for saving the context of the thread to be switched out and restoring the context of the thread to be switched in. Typically threads are switched out when they are waiting for an external event to occur. A thread can also put itself to sleep for a specified period of time and thus its context will be switched out.

When a thread is waiting or sleeping, it generally enters a non-interruptible, blocked (non-running) state until the conditions of the wait or sleep function are satisfied. A waiting thread resumes execution when a specified synchronization object, such as a semaphore, goes through a state transition, as happens when a resource becomes available for use by the waiting thread.

The present invention uses an asynchronous procedure call (APC) to provide a thread interruption function which enables an interrupting thread to prematurely terminate the blocked state of another thread so that the interrupting thread can utilize the functions of the blocked thread. An APC is a well-known asynchronous notification mechanism which permits one thread to request that a specified subroutine, known as a "callback routine," be executed in the context of another thread. APCs are provided as standard system services in an operating system environment such as the Microsoft Windows family of operating systems.

Figure 2B:
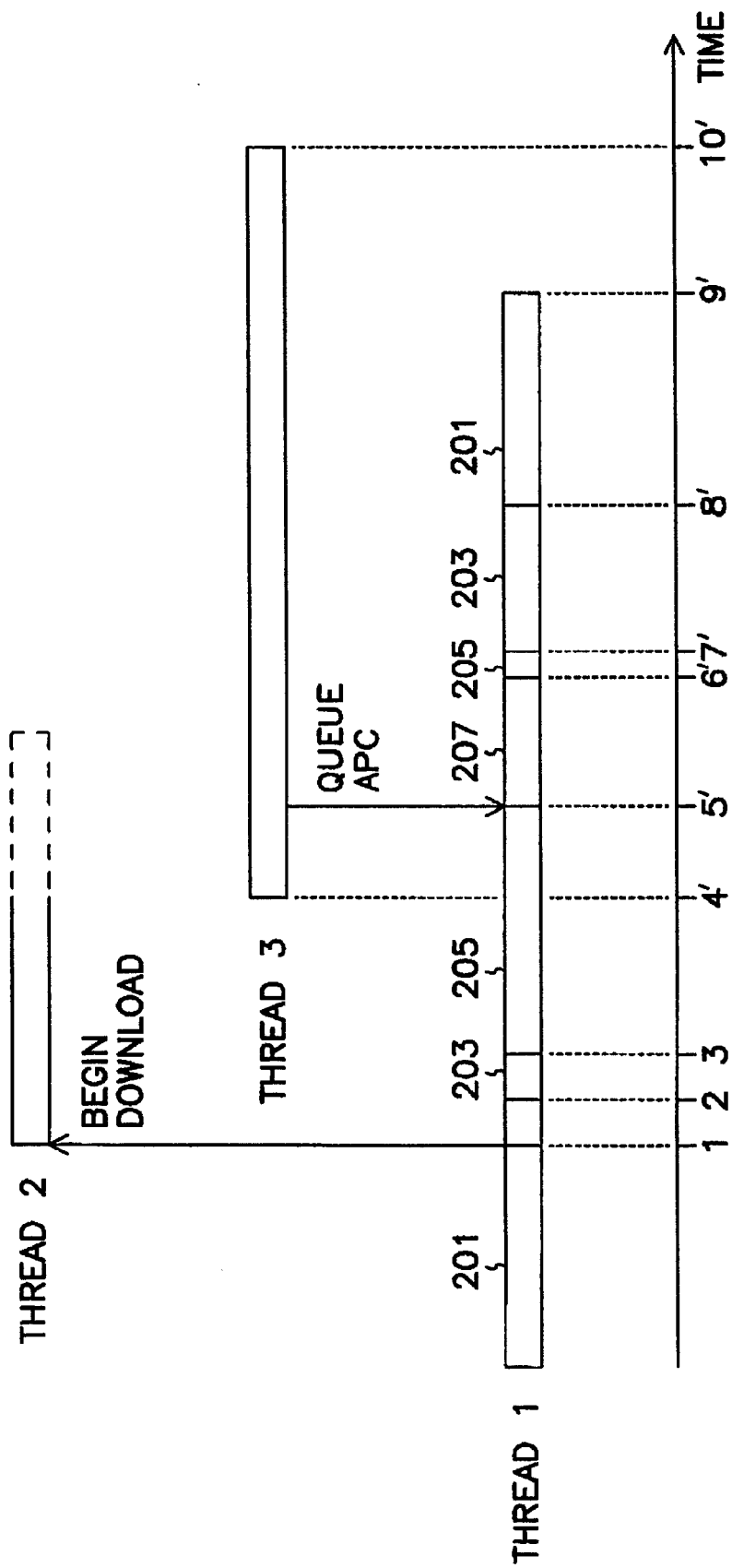
FIG. 2B is a time-line diagram illustrating a system-level overview of thread interactions in an exemplary embodiment of the invention.

The time bars in FIGS. 2A and 2B represent a series of instructions executing within the contexts of different threads. FIG. 2A illustrates a cycle of a thread which is in a blocked state while a second thread is performing a task. The blocked thread is normally awakened when the second thread completes the task. FIG. 2B illustrates the interactions in one embodiment of the present invention between the blocked thread and an interrupting thread that interrupts the blocked thread prior to the completion of the task by the second thread. A World Wide Web browser, such as Microsoft Internet Explorer, which initiates multiple threads to process a page from a web site is used as an example to illustrate the interactions among the threads in FIGS. 2A and 2B. Referring first to FIG. 2A, thread 1 begins a series of instructions 201 which create thread 2 at time mark 1 to download a picture. Thread 1 then calls a sleep operation at time mark 2 to wait for the download to complete. At time mark 3, the sleep operation code 203 invokes an interruptible wait/sleep service provided by the runtime environment. The wait/sleep service 205, executing as necessary in thread 1's context, maintains thread 1 in an "alertable" state. Wait/sleep periods are typically times during which a blocked thread can be alertable but the invention is not limited to embodiments using wait/sleep services.

When thread 2 completes its download, at time mark 4 the wait/sleep service 205 is notified and executes a return to the sleep operation 203, which in turn executes a return to thread 1's code 201 to display the downloaded picture at time mark 5. Exactly when the operating system switches in thread 1's context is dependent upon the particular scheduling algorithm utilized by the operating system.

However, if the user chooses to halt the display of the page using a browser "stop" button, thread 1 must be awakened before it would be awakened normally by the completion of thread 2's download. The interaction of an embodiment of the present invention that provides such a "wake up" service is illustrated in FIG. 2B. When the stop button is "clicked" at time mark 4', the browser directs another thread, thread 3, to terminate all operations associated with the page, including thread 2 which is shown as terminating at some point between time marks 4' and 6'. At time mark 5', thread 3 queues an APC against thread 1. Thread 3 operates asynchronously to the other threads shown in FIG. 2B, completing its functions at time mark 10'.

Because the wait/sleep service 205 is maintaining thread 1 in an alertable state when the APC is queued against it at time mark 5', the runtime environment switches in thread 1's context. The runtime environment executes callback routine code 207 associated with the APC within thread 1's context. The callback routine 207 creates an indicator ("exception") within thread 1's context and executes a return to the wait/sleep service 205 at time mark 6'. The wait/sleep service 205 passes control back to the sleep operation 203 at time mark 7'.

The sleep operation code 203, also running in thread 1's context, determines that an APC was queued against thread 1 and that there is an indicator stored in thread 1's context. At time mark 8', the sleep operation code 203 executes a return to the thread 1 code 201 that initiated it, leaving the indicator stored in thread 1's context. The runtime environment's exception handling service, executing in thread 1's context, detects the presence of the indicator when the sleep operation code 203 returns. The exception handling service dispatches an error to thread 1's code 201 for processing, thereby completing the interruption of thread 1's blocked state. In the present example, thread 1's code 201 determines that its blocked state was interrupted because the stop button was clicked and thread 1's code 201 terminates at time mark 9'.

The system level overview of the operation of an exemplary embodiment of the invention has been described in this section of the detailed description. An interrupting thread can wake up a blocked thread that is in an alertable state through the use of an asynchronous procedure call which permits the interrupting thread to specify that a subroutine should execute in the context of the blocked thread. While the invention is not limited to any particular program or application, for sake of clarity a simplified Web browser program having three threads and operating in a multi-threaded environment has been described. It will be readily apparent to one skilled in the art that the threads can also be threads associated with different programs.

Methods of an Exemplary Embodiment of the Invention

In the previous section, a system level overview of the operation of one exemplary embodiment of the invention was described. In this section, the particular methods performed by a thread interruption function, and the supporting operating system functions, for the exemplary embodiment described above, and for two additional exemplary embodiments, are described by reference to a series of flowcharts. The methods to be performed constitute computer programs made up of computer-executable instructions. Describing the methods by reference to a flowchart enables one skilled in the art to develop such programs including such instructions to carry out the methods on suitable computer processors by executing the instructions from computer-readable media.

FIGS. 3A, 3B, 3C and 3D show flowcharts of methods inclusive of the steps or acts required to be taken by a thread interruption function and the supporting operating system services according to the present invention. The thread interruption function allows one thread to request the awakening of a blocked but alertable thread, such as could be implemented to provide an interruptible wait/sleep function. Such an interruptible wait/sleep function would be invoked by a thread when waiting for another process to complete. However, the invention is not limited to implementing only interruptible wait/sleep functions but can be used to implement any operation in which it is desired that a blocked thread be alertable by another thread.

Figure 3A:
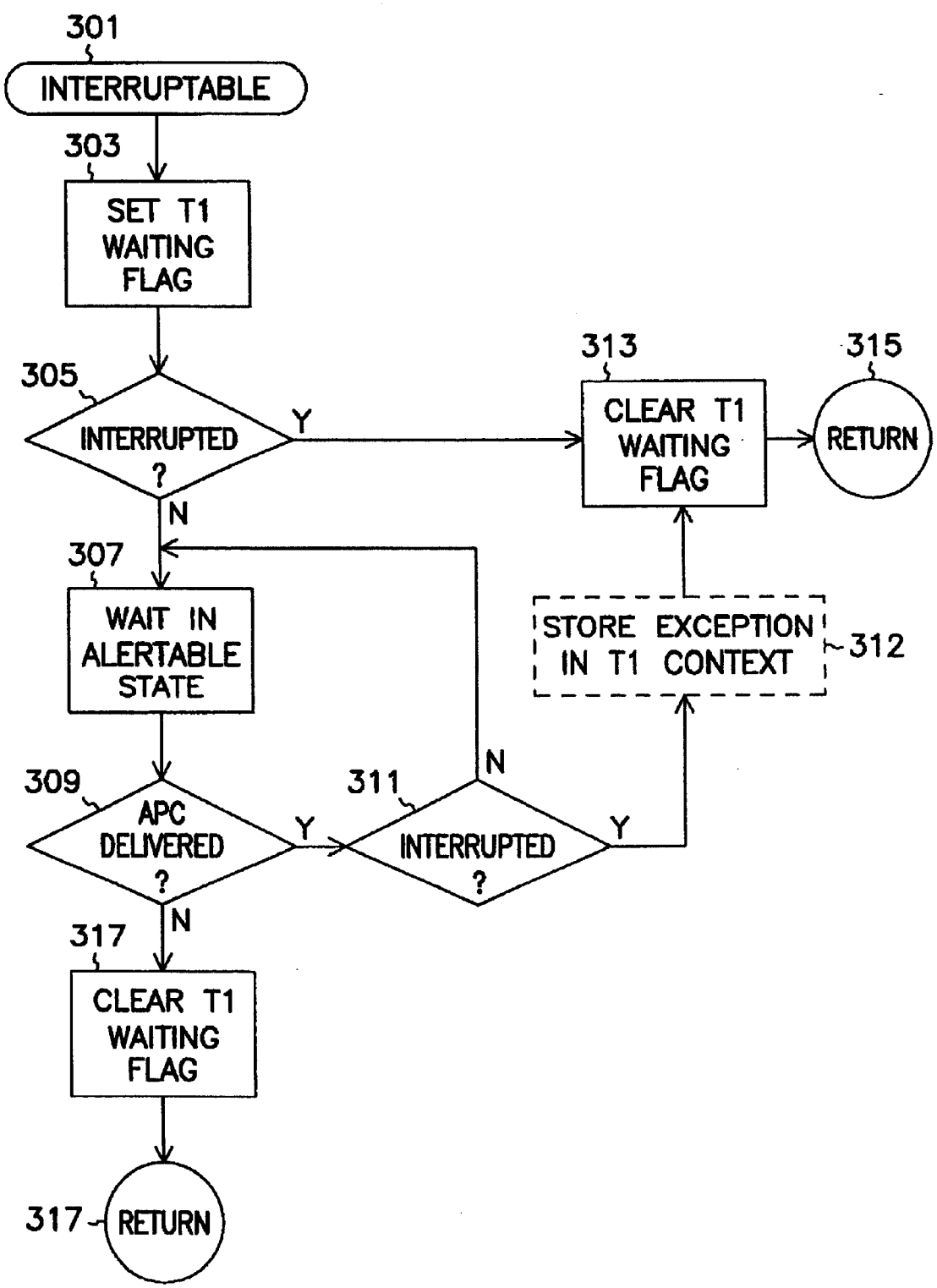
FIGS. 3A, 3B, 3C and 3D are flowcharts of method to be performed by a thread interruption function and supporting operating system services according to three exemplary embodiments of the invention; and, FIGS. 4A and 4B are flowcharts of methods to be performed by a Java implementation of the thread interruption function according to an exemplary embodiment of the invention.
Figure 3B:
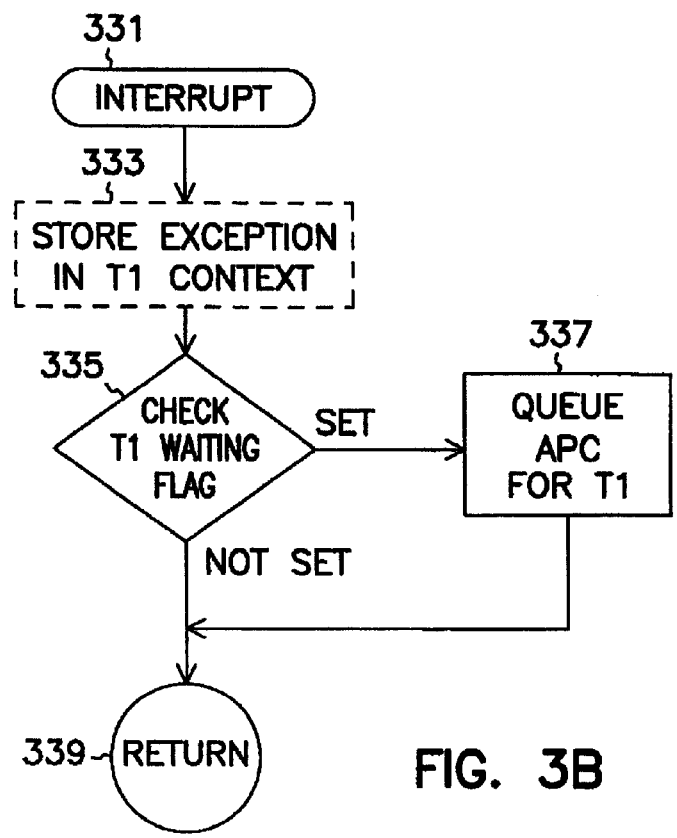
Figure 3C:
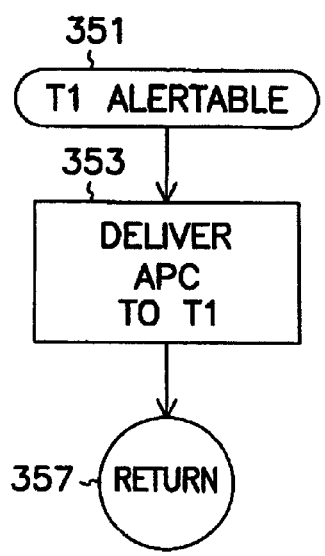
Figure 3D:
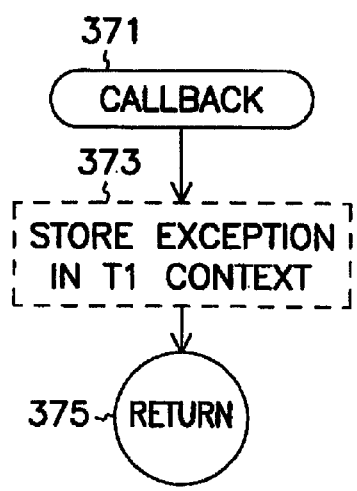

The three exemplary embodiments of a thread interruption function are illustrated in FIGS. 3A, 3B, 3C and 3D. The first, second and third exemplary embodiments for the thread interruption function are described using the steps or acts illustrated in phantom in FIGS. 3A, 3B and 3D respectively. FIG. 3C illustrates the steps or acts taken by a standard APC function in common operating systems. The steps or acts shown in FIGS. 3A, 3C and 3D are performed in the context of the blocked thread. FIG. 3B shows a method inclusive of the steps or acts required to be taken by an interruption procedure of the invention on behalf of an interrupting thread and are performed in the context of the interrupting thread.

The first embodiment of a sleep operation provided by the invention and called by a thread to permit its interruption while in a blocked state is explained in conjunction with FIG. 2B. Thread 1 invokes the sleep operation at step 301 in FIG. 3A to wait for thread 2's download to complete. The sleep operation sets a T1 waiting flag at step 303. Before thread 1 fully enters its alertable state at step 307, the sleep operation determines if thread 1 has already been interrupted. If so, the operation clears thread 1's waiting flag (step 313) and exits at step 315. If not, the sleep operation calls a system level wait/sleep service at step 307 to enter thread 1 into an alertable blocked state. The system level wait/sleep service executing in thread 1's context signals the operating system that thread 1 is blocked but alertable, which causes the operating system to switch in another thread's context.

When thread 3 in FIG. 2B wishes to awaken thread 1 while thread 1 is in the alertable state represented by step 307 in FIG. 2A, thread 3 issues a wake up request to an interrupt procedure provided by the invention (step 331 in FIG. 3B). The interrupt procedure determines whether thread 1 is in an alertable state by checking the T1 waiting flag at step 335. If thread 1 is alertable, the interrupt procedure uses thread 3's context to queue an APC against thread 1 at step 337 and returns to thread 3 (step 339). If thread 1 is not in an alertable state, the interrupt procedure returns to thread 3 without queuing the APC. Step 333 is not performed in the first exemplary embodiment.

Because the APC is queued against thread 1 while it is in an alertable state (step 351 in FIG. 3C), the operating system switches in thread 1's context to execute the APC callback routine (FIG. 3D) within the context of thread 1, thus delivering the APC to thread 1 at step 353. In the first exemplary embodiment, step 373 shown in FIG. 3D is not executed so the callback routine executes a return at step 375. Because the callback routine is executing in thread 1's context, step 375 returns control to the wait/sleep service which was previously executing in thread 1's context. The wait/sleep service, having now been interrupted, exits back to the sleep operation that invoked it.

The sleep operation resumes execution at step 309 in FIG. 3A. Because in the first exemplary embodiment the operating system only delivers an APC to thread 1 for the purposes of waking up thread 1, thread 1 will not re-invoke the wait/sleep service at step 307. The sleep operation stores an indicator, such as a flag or an exception, in thread 1's context (step 312), clears the T1 waiting flag (step 313), and initiates a return to the thread 1 code that called the sleep operation (step 315).

The indicator remains set in thread 1's context upon exiting the sleep operation at step 315 and is caught by the operating system error handling mechanism (not shown) executing in thread 1's context. In response, the error handling mechanism dispatches an error to thread 1. When thread 1's code is activated to process the error, the interruption of thread 1's blocked state is complete. The subsequent execution path of thread 1 is dependent upon thread 1's error handling code.

In situations where the operating system switched in thread 1's context because a condition associated with the alertable state, such as the expiration of a sleep period, was satisfied, the sleep operation in FIG. 3A determines that an APC was not delivered (step 309), clears thread 1's waiting flag (step 317) and exits (step 319).

In the second exemplary embodiment of the thread interruption function, thread 1 enters its alertable state at step 307 as explained above. When thread 3 calls the interrupt procedure at step 331 in FIG. 3B, the interrupt procedure stores the indicator in thread 1's context at 333. The interrupt procedure determines whether thread 1 is in an alertable state by checking the T1 waiting flag at step 335. If thread 1 is alertable, the interrupt procedure uses thread 3's context to queue the APC against thread 1 at step 337 and returns to thread 3 (step 339). If thread 1 is not in an alertable state, the interrupt procedure returns to thread 3 without queuing an APC.

Because there is an APC queued against thread 1 while it is in an alertable state, the operating system (FIG. 3C) switches in thread 1's to execute the APC callback routine within the context of thread 1, thus delivering the APC to thread 1 at step 353. In the second exemplary embodiment, the indicator has already been stored by the time the callback routine shown in FIG. 3D executes, so the callback routine does not execute step 373 but returns control back to the system level wait/sleep service (step 375), leaving the indicator stored in thread 1's context. Having been interrupted, the wait/sleep service returns control back to the sleep operation.

Returning now to FIG. 3A, the sleep operation resumes executing in thread 1's context at step 309. Because the indicator is set at this point, the sleep operation knows the APC was delivered for the purpose of interrupting thread 1's alertable state (step 311). The sleep operation then clears the T1 waiting flag (step 313) and exits back to the thread 1 code that called it (step 315). Upon the return of the sleep operation, the indicator is captured by the operating system error handling mechanism executing in thread 1's context. The error handling mechanism dispatches an error to thread 1 for processing, resulting in thread 1 exiting its blocked state.

A similar series of steps is performed in the third exemplary embodiment, except that the indicator is stored in thread 1's context by the callback routine at step 373 in FIG. 3D. As in the case of the second exemplary embodiment, the indicator is captured by the error handling mechanism upon the sleep operation returning control to the thread 1 code that called it.

In both the second and third exemplary embodiments, if an APC was delivered to thread 1 for a purpose other than interrupting thread 1's blocked state (step 311), thread 1 will re-enter its alertable state at step 307.

The particular methods performed by an interruptible thread function of three exemplary embodiment of the invention have been described. The methods performed to interrupt a blocked thread has been shown by reference to four flowcharts including all the steps from 301 until 319, from 331 to 339, from 351 to 357, and from 317 to 375.

Java Runtime Implementation

In this section of the detailed description, a particular implementation of the invention is described that operates in the runtime environment of a Java Virtual Machine. Java is an object-oriented language and is understood by those of ordinary skill in the art. One way to describe an object is as a discrete bundle of code that performs functions and communicates with other objects through messages. Java source code is compiled into platform-independent "byte codes" that make up Java classes. The byte codes of Java applications are interpreted by a Java runtime environment into machine-specific instructions. That Java runtime environment executes in an emulation of a computer running the Java operating system, known as a Java Virtual Machine (JVM). The JVM executes under the control of a non-Java operating system running on a computer such as computer 20 in FIG. 1. Among the Java classes are "Exceptions" which are used to pass error or other conditions occurring in processes executing in the JVM to general exception handling code in the JVM.

Figure 4A:
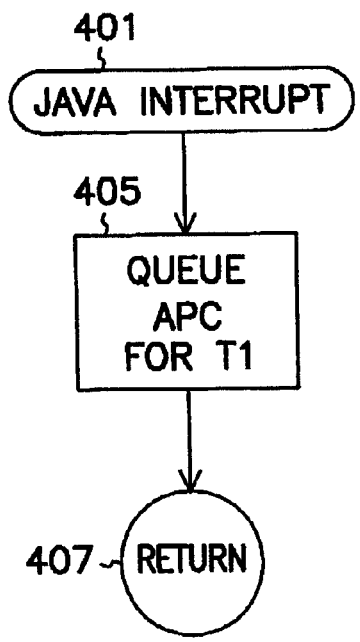

The Java embodiment also references the interaction of the exemplary threads described above in conjunction with FIG. 2B. Thread 1 of FIG. 2B is implemented as a Java client. The steps or acts for a method executed by the thread interruption function in the Java implementation is again shown by FIG. 3A. FIG. 3C represents standard APC services provided by the JVM. The methods shown in flowchart form in FIGS. 4A and 4B are Java versions of the functions provided by the corresponding methods shown in FIGS. 3B and 3D.

As described above in conjunction with FIG. 2B, when thread 1 calls the sleep operation at time mark 2, the sleep operation invokes the system level wait/sleep service to place thread 1 in the blocked state 205, again represented by step 307 in FIG. 3A. Because the wait/sleep service is a function defined within the Java specification as interruptible, the JVM automatically marks thread 1 as alertable, so the steps involving the T1 waiting flag are unnecessary in the Java embodiment.

Since thread 1 is guaranteed to be interruptible during period 305, when thread 3 requests the wake up of thread 1 at time mark 5' (step 401 in FIG. 4A), the APC is queued against thread 1 by the JVM (step 405) and generally delivered immediately to thread 1.

Figure 4B:
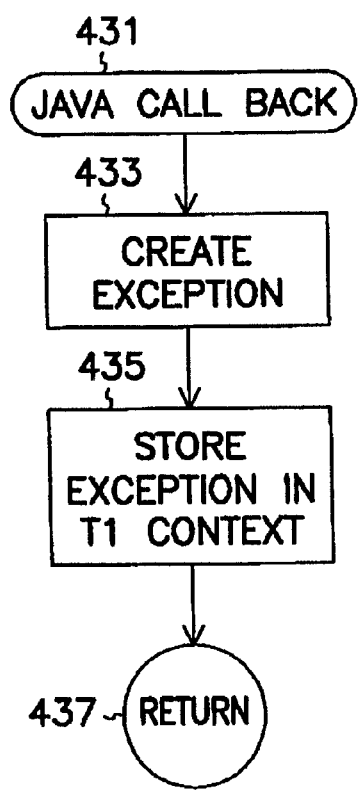

The APC callback routine, executing in thread 1's context, creates an instance of a Java Exception class ("exception") at step 425 in FIG. 4B, and stores it in a data structure in the thread 1's context (step 435). When the callback procedure completes at time mark 6' (step 437), the JVM passes control back to the system level wait/sleep service executing in thread 1's context, which in turn passes control back to the sleep operation. The exception remains stored within thread 1's context.

When the sleep operation regains control at step 309 in FIG. 3A, it determines that thread 1's alertable state was interrupted by the delivery of the APC because of the presence of the exception (steps 309 and 311). The sleep operation then terminates and passes control back to thread 1 at step 315. Because the exception remains associated with thread 1, the general exception handling code in the JVM is invoked as control is being passed back to thread 1's code. The general exception handling code in JVM passes the exception to thread 1's code for processing, thus completing the interruption of thread 1's blocked state at time mark 8'.

A particular implementation of thread interruption using APCs has been described that takes advantage of a standard Java Exception class. Although the methods are described above in terms of Java, the invention encompasses other object-oriented programming languages, such as C++. Furthermore, the concepts are readily applicable to other programming paradigms by one skilled in the art.

Conclusion

Thread interruption using asynchronous procedure calls (APCs) has been described. An APC is a well-known asynchronous notification mechanism which permits one thread to request that a specified subroutine be executed in the context of another thread. An APC does not require the allocation of a synchronization object to wake up a blocked thread that is to execute the specific subroutine, and does not incur the high resource overhead associated with such objects. Additionally, the use of standard APCs requires little additional programming to implement thread interruption.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the invention is readily applicable to any multi-threaded processing environment that supports APCs or other facilities that enable one thread to request a subroutine be executed in the context of another thread. Furthermore, those of ordinary skill within the art will appreciate that object-oriented programming languages other than Java are suitable for use in the invention.

The terminology used in this application with respect to thread interruption using APCs is meant to include all of these environments. Therefore, it is manifestly intended that this invention be limited only by the following claims and equivalents thereof.

We claim:

1. A computer system comprising:
   a processing unit;
   a system memory coupled to the processing unit through a system bus;
   a computer readable medium coupled to the processing unit through a system bus;
   a multi-threaded runtime environment executed from the computer-readable medium by the processing unit, wherein the runtime environment comprises:
   an interruptible wait/sleep service;
   an asynchronous program call (APC) service; and
   an exception handling service; and
   a thread interruption function executed from the computer-readable medium by the processing unit for running within the runtime environment, wherein the thread interruption function comprises:
   a sleep operation that invokes the interruptible wait/sleep service to place a thread in an alertable blocked state; and
   a callback routine that is executed by the runtime environment in response to an interrupting thread causing an APC associated with the callback routine to be queued against the blocked thread, wherein executing the callback routine causes the wait/sleep service to exit back to the sleep operation so that an exception associated with the APC is captured by the exception handling service and the runtime environment activates the blocked thread to process the exception.

2. The computer system of claim 1, wherein executing the callback routine causes the exception to be associated with the APC.

3. The computer system of claim 1, wherein the exception is associated with the APC when the APC is queued against the blocked thread.

4. The computer system of claim 1, wherein the exception is associated with the APC by the sleep operation when the wait/sleep service exits back to the sleep operation.

5. The computer system of claim 1, wherein the multi-threaded runtime environment is an emulation of a computer running an object-oriented, platform-independent operating system.

6. The computer system of claim 1, wherein the thread interruption function further comprises an interrupt procedure that queues the APC against the blocked thread when the interrupt procedure is called by the interrupting thread.

7. The computer system of claim 5, wherein the exception is an object used to pass conditions to general exception handling code in the emulation.

8. In a computer system having a processing unit, a system memory, and a computer readable medium storing a thread interruption function having a sleep operation and a callback routine, a method for awakening a blocked thread in a multi-threaded runtime environment having an interruptible wait/sleep service, an asynchronous program call (APC) service, and an exception handling service, the method comprising:
   executing the thread interruption function from the computer-readable medium by the processing unit to ran in the multi-threaded runtime environment;
   invoking the interruptible wait/sleep service by the sleep operation to place a thread in an alertable blocked state;
   in response to an interrupting thread causing an APC associated with a callback routine to be queued against the blocked thread, executing the callback routine by the runtime environment,
   causing the wait/sleep service to exit back to the sleep operation from said executing the callback routine;
   capturing an exception associated with the APC by the exception handling service; and
   activating the blocked thread by the runtime environment to process the exception.

9. The method of claim 8 further comprising causing the exception to be associated with the APC from said executing the callback routine.

10. The method of claim 8 further comprising associating the exception with the APC when the APC is queued against the blocked thread.

11. The method of claim 8 further comprising associating the exception with the APC by the sleep operation when the wait/sleep service exits back to the sleep operation.

12. The method of claim 8 wherein the multi-threaded runtime environment is an emulation of a computer running an object-oriented, platform-independent operating system.

13. The method of claim 12 wherein the exception is an object used to pass conditions to general exception handling code in the emulation.

14. The method of claim 12 wherein the thread interruption function further has an interrupt procedure, the method further comprising queuing the APC against the blocked thread when the interrupt procedure is called by the interrupting thread.

15. A method performed on a computer system for awakening a blocked thread in a multi-threaded runtime environment, the method comprising:
   executing a multi-threaded runtime environment having an interruptible wait/sleep service, an asynchronous program call (APC) service, and an exception handling service; and
   executing a thread interruption function to run within the runtime environment, wherein the thread interruption function comprises:
   a sleep operation that invokes the interruptible wait/sleep service to place a thread in an alertable blocked state; and
   a callback routine that is executed by the runtime environment in response to an interrupting thread causing an APC associated with the callback routine to be queued against the blocked thread, wherein executing the callback routine causes the wait/sleep service to exit back to the sleep operation so that an exception associated with the APC is captured by the exception handling service and the runtime environment activates the blocked dread to process the exception.

16. The method of claim 15, wherein executing the callback routine causes the exception to be associated with the APC.

17. The method of claim 15, wherein the exception is associated with the APC when the APC is queued against the blocked thread.

18. The method of claim 15, wherein the exception is associated with the APC by the sleep operation when the wait/sleep service exits back to the sleep operation.

19. The method of claim 15, wherein the multi-threaded runtime environment is an emulation of a computer running an object-oriented, platform-independent operating system.

20. The method of claim 19, wherein the exception is an object used to pass conditions to general exception handling code in the emulation.

21. The method of claim 15, wherein the thread interruption function further comprises an interrupt procedure that queues the APC against the blocked thread when the interrupt procedure is called by the interrupting thread.

22. A computer-readable software program carrying medium having a software program carried thereon for executing on a computer to awaken a blocked thread in a multi-threaded runtime environment having an interruptible wait/sleep service, an asynchronous program call (APC) service, and an exception handling service, the computer-executable software program comprising:

a thread interruption function for running on the computer within the runtime environment;

in the thread interruption function, a sleep operation for invoking the interruptible wait/sleep service to place a thread in an alertable blocked state; and in the thread interruption function, a callback routine for executing on the computer within the runtime environment in response to an interrupting thread causing an APC associated with the callback routine to be queued against the blocked thread, wherein executing the callback routine causes the wait/sleep service to exit back to the sleep operation so that an exception associated with the APC is captured by the exception handling service and the runtime environment activates the blocked thread to process the exception.

23. The computer-readable software program carrying medium of claim 22, wherein executing the callback routine causes the exception to be associated with the APC.

24. The computer-readable software program carrying medium of claim 22, wherein the exception is associated with the APC when the APC is queued against the blocked thread.

25. The computer-readable software program carrying medium of claim 22, wherein the exception is associated with the APC by the sleep operation when the wait/sleep service exits back to the sleep operation.

26. The computer-readable software program carrying medium of claim 22, wherein the multi-threaded runtime environment is an emulation of a computer running an object-oriented, platform-independent operating system.

27. The computer-readable software program carrying medium of claim 26, wherein the exception is an object used to pass conditions to general exception hang code in the emulation.

28. The computer-readable software program carrying medium of claim 22, wherein the thread interruption function further comprises an interrupt procedure that queues the APC against the blocked thread when the interrupt procedure is called by the interrupting thread.

* * * * *

UNITED STATES PATENT AND TRADEMARK OFFICE
CERTIFICATE OF CORRECTION

PATENT NO. : 6,560,626 B1  Page 1 of 1
DATED : May 6, 2003
INVENTOR(S) : Hogle et al.

It is certified that error appears in the above-identified patent and that said Letters Patent is hereby corrected as shown below:

Column 12,
Line 51, "dread" should read -- thread --.

Signed and Sealed this

Thirtieth Day of September, 2003

JAMES E. ROGAN
*Director of the United States Patent and Trademark Office*